UNITED STATES PATENT OFFICE.

JACOB M. JOHLIN, OF SYRACUSE, NEW YORK, ASSIGNOR TO SEMET-SOLVAY COMPANY, OF SYRACUSE, NEW YORK, A CORPORATION OF NEW YORK.

PROCESS OF FORMING DIPHENYL OXID.

1,372,434.  Specification of Letters Patent.  Patented Mar. 22, 1921.

No Drawing.  Application filed July 24, 1919. Serial No. 312,960.

*To all whom it may concern:*

Be it known that I, JACOB M. JOHLIN, a citizen of the United States, residing at Syracuse, in the county of Onondaga and State of New York, have invented a new and Improved Process of Forming Diphenyl Oxid, of which the following is a specification.

My invention relates generally to the production of aromatic ethers and more particularly to the manufacture of diphenyl oxid, commercially known as artificial geranium oil.

It has heretofore been known that by fusing a sulfonate, such as sodium benzene sulfonate, with an alkali such as caustic soda, the corresponding phenate is produced, and also that by substituting the phenate for the alkali in such fusion an aromatic ether is produced.

In the production of the phenate in this manner enough alkali is employed to effect as complete a conversion of the sulfonate as possible.

I have found that if, in effecting the reaction of the sulfonate with the alkali, instead of employing sufficient alkali to effect the complete conversion of the sulfonate, the proportion of alkali is reduced so as to leave a part of the sulfonate unacted upon at the temperature employed, and the process is then continued at the higher temperature required, the reaction between the sulfonate and the phenate is directly effected and the ether is produced in a continuous process.

Thus the formation of the ether is accomplished in a much more simple and economical manner than has heretofore been possible.

In carrying my invention into effect I mix together a suitable sulfonate such as sodium benzene sulfonate and an alkali, such as caustic soda, in such proportions that when the reaction is complete at the initial combining temperature the excess of sulfonate and the formed phenate will be present, as nearly as possible, in combining proportions. In practice I have found approximately 60 per cent. of the amount of alkali theoretically required to combine with all the sulfonate a desirable proportion.

The mixture is then heated in a closed retort or chamber to the reaction temperature, until the reaction between the sulfonate and the alkali is practically completed, as will be indicated by the cessation of formation of water from the reaction.

The temperature is then raised to such a point as to effect reaction between the sulfonate and phenate present *i. e.* to approximately 420° C., and the diphenyl oxid will be formed and will distil off and be condensed and collected outside the chamber. This is continued until the reaction between the sulfonate and phenate is completed. In conducting the operation care should be taken that the temperature is not raised to such a point as to cause decomposition of the sulfonate.

The diphenyl oxid vapor that passes off from the chamber is condensed in any suitable manner as by passing it through cooling coils, and is collected in liquid form.

By means of my invention I am able to produce diphenyl oxid from a sulfonate and an alkali in one continuous operation with consequent simplicity of procedure and economy, the advantage of which will be readily apparent to those skilled in the art.

What I claim as new and desire to secure by Letters Patent is:—

The process of forming diphenyl oxid which consists in heating to a combining temperature so as to form a phenate a mixture of sodium benzene sulfonate and caustic soda in such proportions as to leave uncombined a portion of the sulfonate and continuing the operation at such temperature as to effect reaction between the uncombined sulfonate and the formed phenate to form the diphenyl oxid.

In testimony whereof I have affixed my signature this 22d day of July, 1919.

JACOB M. JOHLIN.